Dec. 30, 1924. 1,520,993
O. ZERK [NOW BY JUDICIAL CHANGE OF NAME O. U. ZERK]
LUBRICATING APPARATUS
Filed March 14, 1921
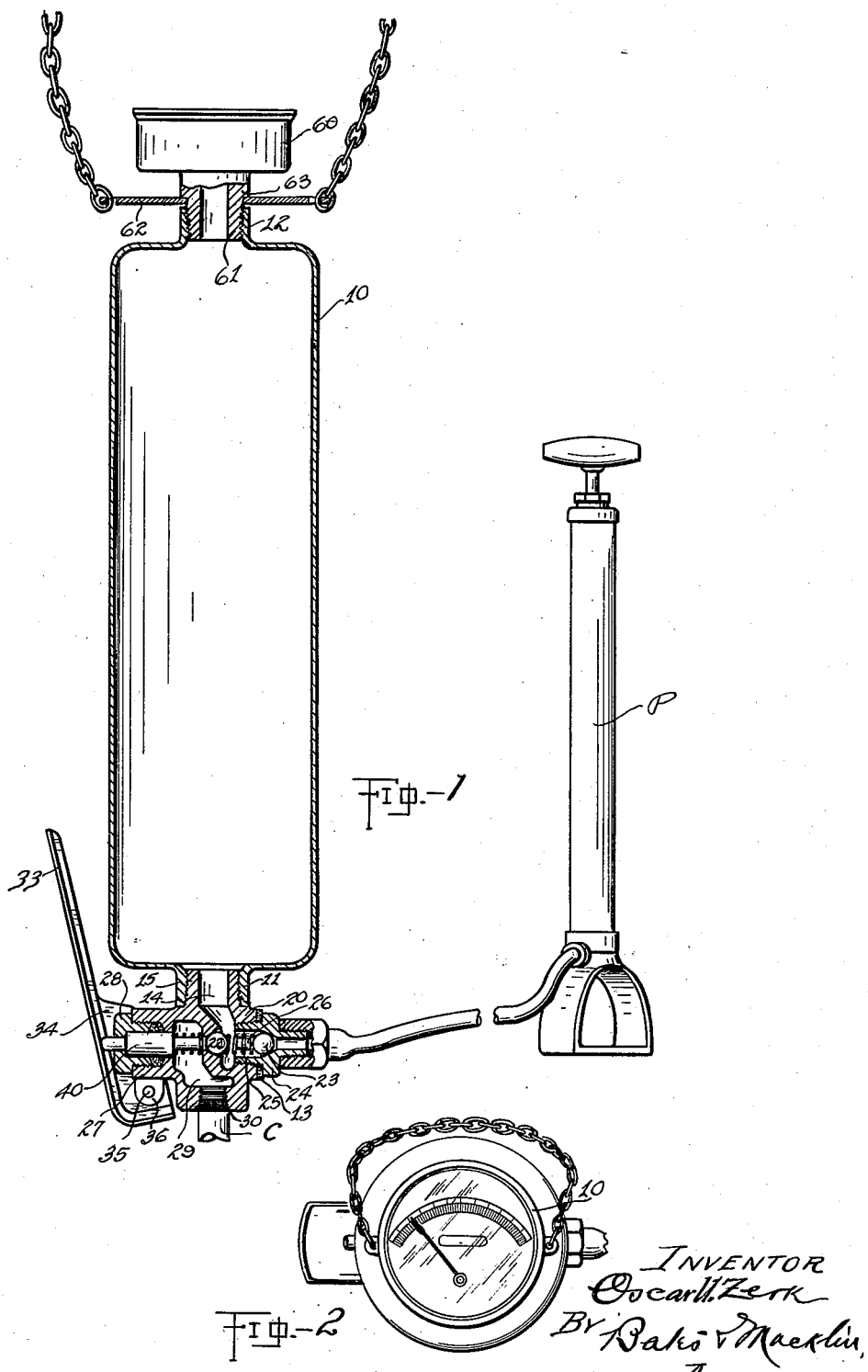

Patented Dec. 30, 1924.

1,520,993

UNITED STATES PATENT OFFICE.

OSCAR ZERK, NOW BY JUDICIAL CHANGE OF NAME OSCAR ULYSSES ZERK, OF CLEVELAND, OHIO, ASSIGNOR, BY MESNE ASSIGNMENTS, TO THE ALLYNE-ZERK COMPANY, OF CLEVELAND, OHIO, A CORPORATION OF OHIO.

LUBRICATING APPARATUS.

Application filed March 14, 1921. Serial No. 452,129.

*To all whom it may concern:*

Be it known that I, OSCAR ZERK, now by judicial change OSCAR ULYSSES ZERK, a citizen of Czechoslovakia, residing at Cleveland, in the county of Cuyahoga and State of Ohio, have invented a certain new and useful Improvement in Lubricating Apparatus, of which the following is a full, clear, and exact description, reference being had to the accompanying drawings.

My invention relates to lubricating apparatus, particularly to a pressure device for holding lubricant under pressure, and adapted to deliver it to a bearing. One object of the device is to provide a pressure tank which shall have convenient connections for causing and maintaining pressure therein, and an easily operated means for allowing the outlet of the lubricant to a pipe or the like for delivery to a bearing. The device is especially adapted for use with a liquid lubricant.

Another object is to provide a pressure tank in the form of a barrel which shall have an outlet valve and means adjacent the lower end of the valve adapted to be grasped by the operator when he seizes the lower end of the barrel, so as to provide a convenient release.

Another object is to provide such a device which may be cheaply manufactured, and still be durable and efficient and simple in operation. Other objects of the invention will be apparent in the course of the following description, and the features of novelty will be pointed out in the claims.

Referring to the drawing, in which embodiments of my invention are illustrated, Fig. 1 is a longitudinal section through a device embodying my invention. Fig. 2 is a top plan view of the device of Fig. 1.

Referring to the different parts by numerals, 10 is a cylindrical chamber or tank for containing lubricant and having its upper and lower ends provided with interiorly threaded bosses 11 and 12.

In the lower boss 11, there is inserted the pipe threaded nipple 15 of the valve plug 20. The plug 20 has a passageway 14 extending through the nipple 15 and into the body of the plug. This passageway has two transverse openings adjacent its middle portion, one of them provided with a valve seat containing the ball valve 22 seated therein, while aligned with this opening there is a threaded opening containing the pipe threaded nipple of the valve plug 24 in which is seated a ball valve 23. A spring 25 bears upon these two valves, and tends to hold them in place on their respective seats. A cylindrical block 26 may be inserted in this spring to prevent bowing thereof, and also serve as a spacer when either of the valves is forced inward. The member 24 has a second nipple to which a suitable connection may be made with a source of pressure such as the pump P.

In line with the valves 22 and 23 is a plunger 40 which has its ends passing through an opening through the boss 27, while a suitable packing 28 is employed to maintain a tight seal about this plunger. The plunger has reduced portions on each end, one of which extends outside of the packing and the plug, and the other inwardly through the chamber 29 of the plug, and in position adjacent the valve 22 so that when the plunger 40 is forced inwardly the valve 22 is forced off its seat to allow lubricant to pass into chamber 29 and through the opening 30 connecting therewith.

The opening 30 may preferably be threaded to receive a suitable connection, such as a pipe C. In order to provide a ready means for actuating the plunger and thereby open the valve 22, I have shown a lever 33 pivoted on the ears 36 of the boss 27 by suitable means, such as the pin 35 projecting through these ears and through the side members 34 of the lever 33. It will be seen that the lever 33 extends upward adjacent the lower end of the tank, so as to allow the ready holding of the lever against the tank, which will result in the lever forcing the plunger 40 inward to release the valve 22.

As shown in Fig. 1, the upper boss 12 may have inserted therein the nipple 61 of a pressure gauge 60. A bar member 62 having a central annular portion adapted to surround the stem 61 may be inserted and be swiveled on the stem in position between the end of the boss 12 and a shoulder 63 on the nipple 61. This bar 62 has eyes at its ends, adapted to receive the ends of a chain 64 or the like which serves as a handle to render transportation of the device easy.

It will be seen that pressure may be created in the tank by forcing gas through the valve 23, which gas will then pass upward above the lubricant in the tank 10. If a pressure gauge be connected to the tank, the operator will know at all times the exact condition of the pressure therein. Upon manipulation of the lever 33, the lubricant may then be delivered to the opening 30.

While I have described a specific embodiment of my invention, it is apparent that many different forms embodying the principles thereof may be made, and the foregoing description is therefore to be taken as illustrative of my invention and not as restrictive of its character and scope.

Having thus described my invention, I claim:—

1. In a device of the class described, a pressure chamber containing lubricant, an outlet having check valves therein, means for forcing gas into said tank through one of said valves, and means operable to open the second valve to allow escape of the lubricant therethrough.

2. In a device of the class described, a pressure chamber containing lubricant, an outlet, aligned ball valves therein, a spring bearing on said valves to hold them in their seat, means for forcing gas under pressure into said tank through one of said valves, and a plunger for opening the other of said valves.

3. In a device of the class described, a pressure tank containing lubricant, an outlet having check valves therein, a nipple adjacent one of said valves adapted to receive a connection for forcing gas into said tank through one of said valves, and means operable to open the second valve to allow escape of the lubricant therethrough.

4. In a device of the class described, a pressure tank adapted to contain lubricant, a valve plug communicating with said tank and having valve seats, valves for said seats, means extending adjacent said tank for operating one of said valves, and a nipple adjacent the other valve adapted to receive a connecting member.

5. In a device of the class described, a pressure tank adapted to contain lubricant, a valve plug communicating therewith and having aligned valve seats therein, ball valves on said seats, a spring intermediate and bearing against said valves, an outlet opening communicating with one of said seats, and an inlet opening communicating with the other seat, means for forcing gas under pressure into said tank through said inlet opening, and manually operated means for opening the outlet valve.

In testimony whereof, I hereunto affix my signature.

OSCAR ZERK,

*Now, by judicial change Oscar Ulysses Zerk.*